United States Patent
Vanni et al.

(10) Patent No.: US 9,402,502 B2
(45) Date of Patent: Aug. 2, 2016

(54) HOT-BEVERAGE-MAKING APPARATUS, IN PARTICULAR FOR MILK BEVERAGES SUCH AS CAPPUCCINO, CHOCOLATE AND THE LIKE

(75) Inventors: Alfredo Vanni, Magliolo (IT); Marcello Arcangeli, Turin (IT); Francesco Viarizzo, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 365 days.

(21) Appl. No.: 12/829,610

(22) Filed: Jul. 2, 2010

(65) Prior Publication Data
US 2012/0000372 A1 Jan. 5, 2012

(51) Int. Cl.
| | | |
|---|---|---|
| A23F 3/00 | (2006.01) |
| A47J 31/44 | (2006.01) |
| A47J 43/10 | (2006.01) |
| B01F 3/04 | (2006.01) |
| B01F 7/00 | (2006.01) |
| B01F 7/16 | (2006.01) |

(52) U.S. Cl.
CPC .......... *A47J 31/4489* (2013.01); *A47J 43/1093* (2013.01); *B01F 3/04453* (2013.01); *B01F 7/00558* (2013.01); *B01F 7/161* (2013.01); *B01F 2215/0422* (2013.01); *B01F 2215/0427* (2013.01); *B01F 2215/0481* (2013.01)

(58) Field of Classification Search
CPC .......... B01F 7/00008; B01F 7/16; B01F 9/00; B01F 7/162

USPC .............. 99/287, 323.3, 323.1, 476; 366/148, 366/204

See application file for complete search history.

(56) References Cited

U.S. PATENT DOCUMENTS

| | | | | |
|---|---|---|---|---|
| 2,612,353 | A | * | 9/1952 | Steiner et al. .................. 366/145 |
| 2,639,133 | A | * | 5/1953 | Clary ............................. 432/113 |
| 2006/0151496 | A1 | * | 7/2006 | Healy et al. ................. 220/23.83 |
| 2007/0170102 | A1 | * | 7/2007 | Barani ...................... 210/167.11 |
| 2008/0008806 | A1 | * | 1/2008 | Boussemart et al. .......... 426/519 |
| 2009/0129199 | A1 | * | 5/2009 | Chang et al. .................. 366/148 |

FOREIGN PATENT DOCUMENTS

| | | | | |
|---|---|---|---|---|
| CN | 201365501 | * | 12/2009 | ................ A23L 1/20 |
| DE | 203 00 851 U1 | | 7/2004 | |
| DE | 10 2004 063 278 A1 | | 7/2006 | |
| DE | 10 2004 063 285 A1 | | 7/2006 | |
| EP | 1 197 175 A | | 4/2002 | |

* cited by examiner

*Primary Examiner* — Phuong Nguyen
(74) *Attorney, Agent, or Firm* — Sughrue Mion, PLLC

(57) ABSTRACT

A hot-beverage-making apparatus, in particular for milk beverages such as cappuccino, chocolate and the like, comprising a container extending along an axis, a lid closing the container, a rotary mechanical stirrer fitted with an impeller, and a steam wand connectable to a steam source and having an end steam outlet. The stirrer and the wand extend, sloping with respect to each other, inside the container, and the end steam outlet of the wand is located above and radially eccentric with respect to the impeller of the stirrer.

18 Claims, 3 Drawing Sheets

HOT-BEVERAGE-MAKING APPARATUS, IN PARTICULAR FOR MILK BEVERAGES SUCH AS CAPPUCCINO, CHOCOLATE AND THE LIKE

The present invention relates to a hot-beverage-making apparatus, in particular for milk beverages such as cappuccino, chocolate and the like. The apparatus is designated in particular for home use, in that it can also be manufactured in the form of an accessory for conventional espresso coffee machines.

Numerous, even household, hot-beverage-making apparatuses are known.

Also known, however, is the difficulty in making certain beverages, particularly cappuccino, of the same quality as those produced by professional operators.

Even when equipped with milk-frothing devices (typically steam dispensers), as required for a good cappuccino, household coffee machines rarely produce beverages of professional quality, on account of this mainly depending on the skill and experience of the operator.

At the present time, there would appear to be no apparatus that is quick and easy to use, even by inexperienced, non-professional users, and that provides for producing quality beverages comparable in all respects to those produced by professional operators on professional machines.

It is therefore an object of the present invention to provide a straightforward, practical, compact, highly efficient apparatus enabling even inexperienced users to produce beverages, including cappuccino, of superior quality in terms of consistency, creaminess and temperature.

According to the present invention, there is provided a hot-beverage-making apparatus, in particular for milk beverages such as cappuccino, chocolate and the like, as defined in general terms in the accompanying Claim 1, and in additional terms in the dependent Claims.

By virtue of the combined action of the mechanical stirrer and the steam wand, as well as other special design features, the apparatus according to the present invention provides for producing quality hot beverages, in particular hot milk beverages such as cappuccino, easily and efficiently, with no particular assistance, and therefore skill, on the part of the user.

The apparatus according to the present invention is also easy and relatively cheap to produce, comprises a small number of component parts, and is highly compact.

The apparatus according to the present invention can also be produced in the form of a separate accessory connectable to a conventional espresso coffee machine, to use the steam generated by the machine.

A non-limiting embodiment of the present invention will be described by way of example with reference to the accompanying drawings, in which.

Figure 1:
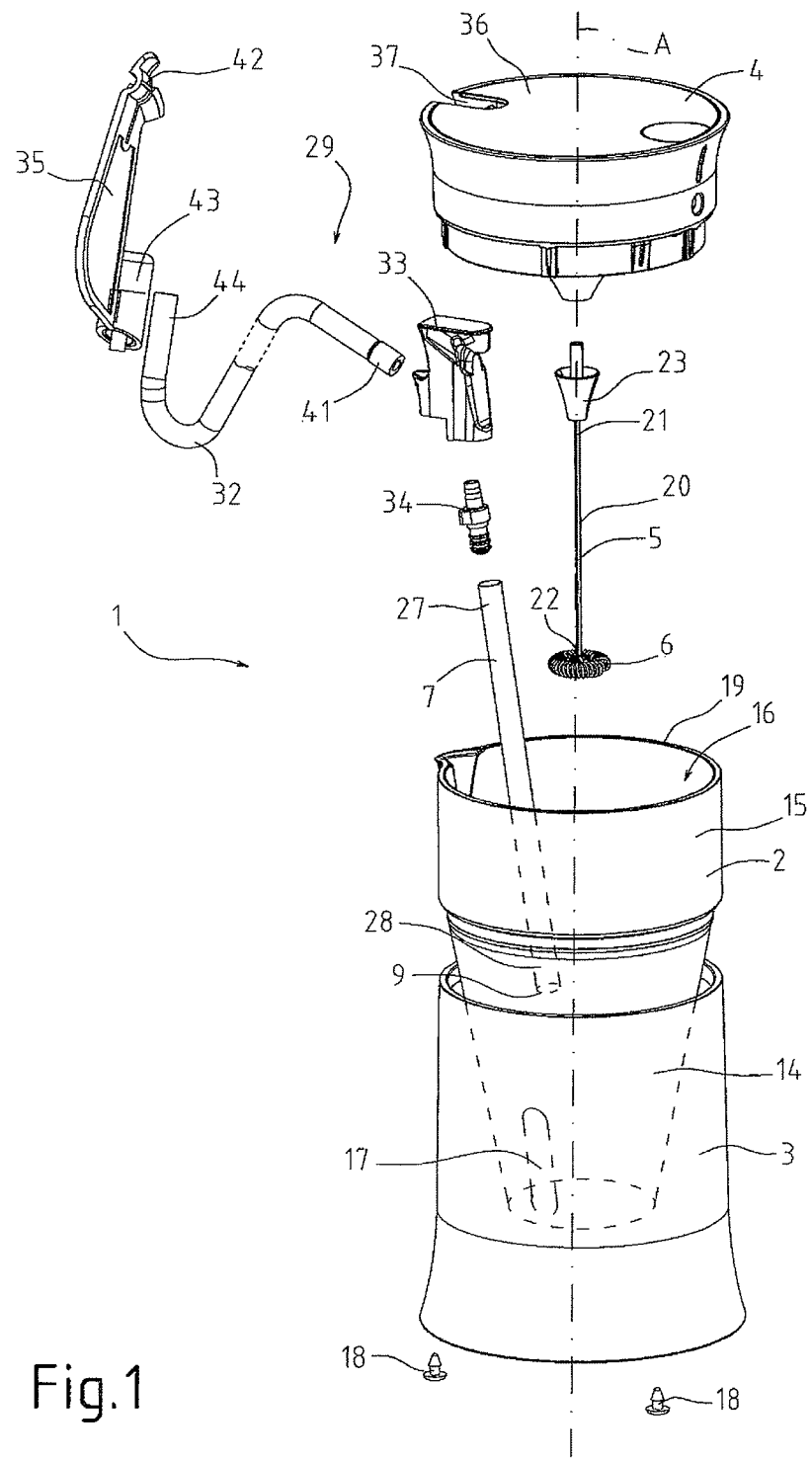
FIG. 1 shows an exploded view in perspective of a hot-beverage-making apparatus in accordance with the present invention.
Figure 2:
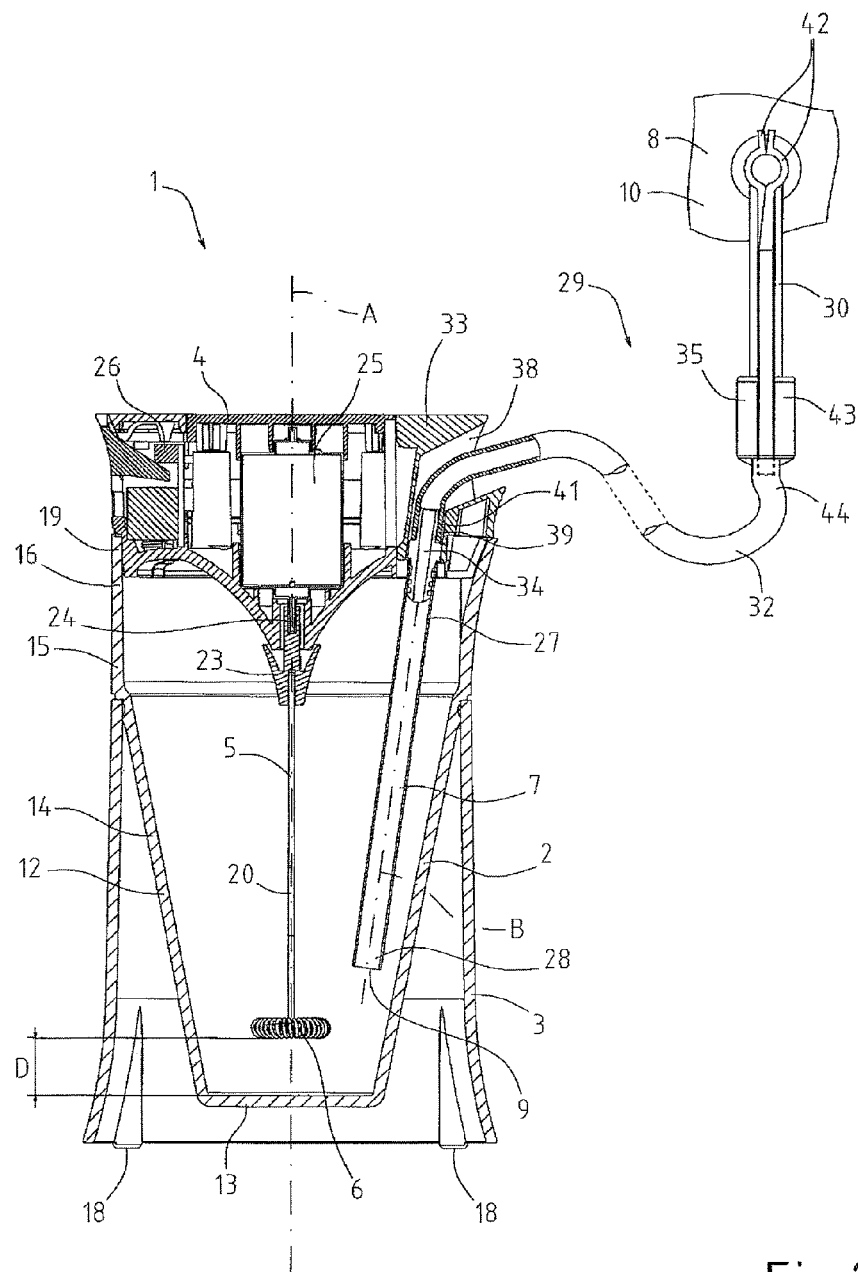
FIG. 2 shows a schematic longitudinal section of the FIG. 1 apparatus connected to a coffee machine.

Number 1 in FIGS. 1 and 2 indicates as a whole a hot-beverage-making apparatus, in particular for milk beverages such as cappuccino, chocolate and the like.

Apparatus 1 in the following description is designed, in particular, for home use, by being made in the form of an accessory connectable to a known conventional espresso coffee machine (not shown, for the sake of simplicity). It is understood, however, that the apparatus according to the present invention may also be incorporated in an espresso coffee machine, and so forms part, as opposed to an accessory, of the machine.

Apparatus 1 comprises a container 2 extending, in use, along a substantially vertical axis A; a casing 3 housing container 2; a removable lid 4 closing container 2; a rotary mechanical stirrer 5 fitted on the end with an impeller 6; and a steam wand 7 connected to a steam source 8 and having an end steam outlet 9.

Container 2 is designed to contain a liquid (e.g. milk) from which to produce the desired beverage, and comprises a lateral wall 12 extending about axis A; and a bottom wall 13. Container 2 preferably, though not necessarily, converges towards bottom wall 13, e.g. is substantially truncated-cone-shaped, or comprises at least one truncated-cone-shaped processing portion 14. In the non-limiting example shown, the container comprises a processing portion 14 tapering towards bottom wall 13, i.e. a substantially truncated-cone-shaped portion; and a substantially cylindrical top portion 15 over portion 14 and having a top end 16 closed by lid 4.

Container 2 has a seat-sensitive indicator 17, e.g. a known heat-sensitive patch applied to lateral wall 12 to visually indicate (e.g. by changing colour) when a given temperature threshold is reached.

Casing 3 comprises a hollow body extending about axis A and removably housing container 2 so that lid 4 projects from the top of casing 3; and casing 3 is fitted at the bottom with vibration-damping feet 18.

Lid 4 fits onto a peripheral top end edge 19 of container 2 to close top end 16 of the container 2.

Lid 4 supports stirrer 5 and wand 7, which project from lid 4 into container 2 and slope with respect to each other; and the end steam outlet 9 of the wand 7 is located above and radially eccentric, i.e. positioned radially outwards, with respect to impeller 6 of stirrer 5.

Stirrer 5 rotates about a substantially vertical axis of rotation, is preferably located centrally inside container 2, and extends substantially along axis A of container 2, which also defines the axis of rotation of stirrer 5.

More specifically, stirrer 5 comprises a substantially straight stem 20, which in use extends along axis A between a drive end 21 and a free end 22 fitted with impeller 6. Drive end 21 is fitted with a joint 23 connected removably to a drive shaft 24 of a motor 25, e.g. an electric motor housed in lid 4 and controlled by an electronic card 26. For the sake of simplicity, the contacts, electric connections, power and control of motor 25 are not shown.

Motor 25 is designed so that the rotation speed of stirrer 5 immersed in a process liquid (milk or milk-based liquid) ranges roughly between 4500 and 5500 rpm, and preferably between roughly 4800 and 5000 rpm.

Impeller 6 is fitted to the free (bottom) end 22 of stem 20, and is located a given distance D, from bottom wall 13 of container 2, ranging roughly between 10 mm and 20 mm, and preferably of about 15 mm.

In the non-limiting example shown, impeller 6 is defined by a winding of metal wire wound into a toroidal spiral; and a straight portion of the metal wire forms stem 20.

Wand 7 extends substantially along an axis B sloping with respect to axis A.

In the example shown, wand 7 is substantially straight and slopes with respect to axis A and/or at least comprises a substantially straight portion sloping with respect to axis A. in the non-limiting example, wand 7 is defined by a straight tube having a connecting end 27, and a free end 28 opposite connecting end 27 and having outlet 9.

More specifically, wand 7 is fixed to lid 4, close to edge 19 of container 2, and projects into and slopes inwards of container 2.

Figure 3:
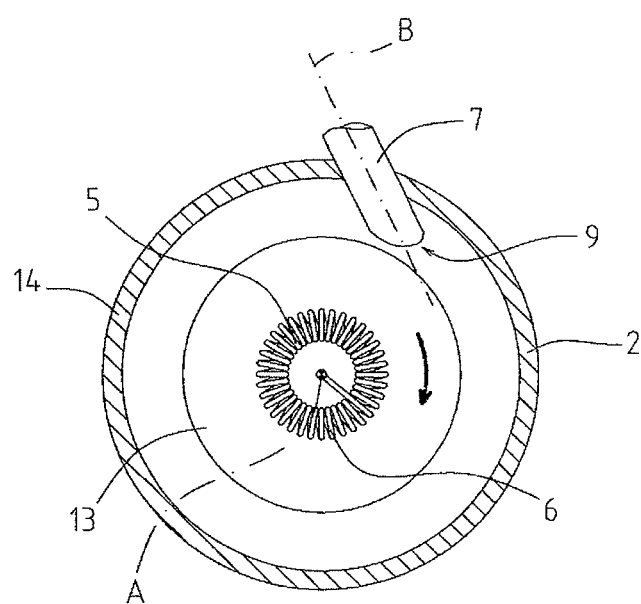
FIG. 3 shows a schematic cross section, with parts removed for clarity, of a detail of the FIG. 1 apparatus.

As shown schematically in FIG. 3, wand 7 also slopes in the rotation direction of stirrer 5, and more specifically of impeller 6. In other words, wand 7 slopes both radially inwards of container 2, and circumferentially in the rotation direction of impeller 6.

By way of example, though not necessarily, wand 7 slopes with respect to (vertical) axis A by an angle of roughly 5-15°, and preferably of about 7-10°, and circumferentially by an angle of roughly 5-50°.

Wand 7 is connected by a releasable connecting system 29 to steam source 8, which advantageously forms part of a known espresso coffee machine 10, only a detail of which—namely, a steam nozzle 30 projecting from a wall of machine 10—is shown.

More specifically, connecting system 29 comprises a steam supply pipe 32, preferably a hose; a connector 33 with an end fitting 34; and a support 35.

Connector 33 is fitted releasably to a peripheral edge 36 of lid 4. More specifically, connector 33 is designed to engage a seat 37 formed axially through lid 4, more specifically in peripheral edge 36 of lid 4, and has an inner through channel 38, into which steam supply pipe 32 is inserted, and which comprises a seat 39 housing end fitting 34. Connecting end 27 of wand 7, and first end 41 of steam supply pipe 32 fit onto opposite ends of end fitting 34; and seat 39 slopes with respect to axis A so that wand 7, when fitted to end fitting 34 housed inside seat 39, also slopes with respect to axis A as described previously.

Support 35 has fasteners 42 for connection to nozzle 30, e.g. spring grips or clips that fit onto the outside of cylindrical pipes of various diameters; and a connector 43 for connecting nozzle hydraulically to a second end 44, opposite first end 41, of steam supply pipe 32.

In actual use, the liquid, e.g. milk, in container 2 is heated by steam from source 8, and at the same time stirred by stirrer 5. Steam is fed into container 2 by wand 7 connected to nozzle 30 by connecting system 29, and the outlet 9 of which is immersed in the liquid at least while stirrer 5 is rotated (which obviously raises the liquid level in the container 2).

When the milk in container 2 reaches the right temperature, indicator 17 indicates (e.g. by changing colour) that processing can be stopped; and the user, after removing lid 4, can add the milk to other ingredients, e.g. to coffee made in known manner on machine 10, to obtain a cappuccino as required.

Clearly, changes may be made to the apparatus as described and illustrated herein without, however, departing from the scope of the accompanying Claims.

What is claimed is:

1. A hot-beverage-making apparatus, in particular for milk beverages, comprising:
    a container extending along an axis,
    a lid closing the container,
    a rotary mechanical stirrer fitted on one end thereof with an impeller,
    a steam source for producing steam; and
    a means for heating and frothing a liquid in a container, the means including a steam wand connected to the steam source and having an end steam outlet,
    wherein the stirrer and the wand extend obliquely with respect to each other inside the container at an angle between 5° and 50°, and the end steam outlet of the wand is located above and radially eccentric with respect to an uppermost surface of the impeller of the stirrer;
    wherein the container has a heat-sensitive indicator, adapted to indicate visually when a predetermined temperature threshold is reached;
    wherein the lid is connected to the impeller, and
    the end steam outlet is configured to dispense steam directly to the liquid.

2. The apparatus according to claim 1, wherein the impeller is located at a distance comprised between about 10 mm and about 20 mm from a bottom wall of the container.

3. The apparatus of claim 2, wherein the impeller is located at a distance of about 15 mm from the bottom wall of the container.

4. The apparatus according to claim 1, wherein the stirrer is driven by a motor designed so that the rotation speed of the stirrer immersed in a milk-based liquid is comprised between about 4500 and about 5500 rpm.

5. The apparatus of claim 4, wherein the stirrer is driven by a motor configured so that the rotation speed of the stirrer immersed in a milk-based liquid is comprised between 4800 and 5000 rpm.

6. The apparatus according to claim 1, wherein the wand is fixed to the lid, close to a peripheral edge of the container, projects inside the container, and slopes inwards of the container.

7. The apparatus according to claim 1, wherein inside the container the wand slopes downwards and forwards in the rotation direction of the stirrer.

8. The apparatus according to claim 1, wherein the stirrer is positioned centrally inside the container, extends substantially along the axis of the container, and rotates about a substantially vertical axis of rotation.

9. The apparatus according to claim 1, wherein the stirrer comprises a stem, and the impeller on a bottom end of the stem.

10. The apparatus according to claim 1, wherein the stirrer and the wand are fitted to the lid, and project from the lid into the container.

11. The apparatus according to claim 1, comprising a connecting system for releasable connection to a steam nozzle of an espresso coffee machine, the wand being connected to said connecting system.

12. The apparatus according to claim 1, further comprising a connector having an end fitting, to which a connecting end of the wand and a first end of a steam supply pipe are connected.

13. The apparatus according to claim 12, wherein the connector has a through channel into which the steam supply pipe is inserted, and which comprises a seat housing said end fitting; the seat sloping with respect to said axis so that the wand, when fitted to the end fitting, also slopes with respect to said axis.

14. The apparatus according to claim 12, further comprising a support, in turn comprising fasteners for connection to a steam nozzle of a coffee machine, and a connector for connecting said steam nozzle to a second end of the steam supply pipe.

15. The apparatus according to claim 1, wherein the container has a bottom wall, converges towards said bottom wall, and in particular is substantially shaped as a truncated cone.

16. An apparatus, comprising:
    a hollow casing;
    a container extending along an axis and being configured to be removably received in the hollow casing;
    a lid for closing the container;
    a rotary mechanical stirrer fitted on one end thereof with an impeller;

a means for heating and frothing a liquid in a container, the means including a steam source for producing steam;

a steam wand removably connected to the steam source having an end steam outlet, the stirrer and the wand extend obliquely with respect to each other inside the container at an angle between 5° and 50°, and the end steam outlet of the wand is located above and radially eccentric with respect to an uppermost surface of the impeller of the stirrer; and connecting means for removably connecting the steam wand to the steam source, wherein the stirrer is driven by a motor configured such that the rotation speed of the stirrer in the liquid ranges between about 4500 and about 5500 rpm;

wherein the container has a heat-sensitive indicator, adapted to indicate visually when a predetermined temperature threshold is reached;

wherein the lid is connected to the impeller, and the end steam outlet is configured to dispense steam directly to a liquid.

17. The apparatus of claim 1, wherein the steam heats and froths the liquid.

18. The apparatus of claim 16, wherein the steam heats and froths the liquid.

* * * * *